United States Patent Office 3,567,793
Patented Mar. 2, 1971

3,567,793
OXIDATIVE DEHYDROGENATION OF ORGANIC COMPOUNDS
Philip M. Colling and Johnny C. Dean, Houston, Tex., assignors to Petro-Tex Chemical Corporation, Houston, Tex.
No Drawing. Filed Sept. 28, 1967, Ser. No. 671,236
Int. Cl. C07c 5/18
U.S. Cl. 260—680    23 Claims

ABSTRACT OF THE DISCLOSURE

Oxidative dehydrogenation of organic compounds in vapor phase utilizing manganese ferrite. The manganese ferrite is formed in the presence of halogen.

BACKGROUND OF THE INVENTION

(1) Field of the invention

This application relates to the oxidative dehydrogenation of organic compounds in the presence of manganese ferrite which has been prepared by a particular manner. The invention is particularly suitable for the dehydrogenation of hydrocarbons and preferred products are such as olefins or diolefins.

(2) Description of the prior art

Organic compounds are commercially dehydrogenated by contacting the compound to be dehydrogenated at an elevated temperature preferably in the presence of catalysts. One method of dehydrogenation is known as oxidative dehydrogenation. According to this process, hydrogen released from the organic compounds reacts with oxygen to form water. One of the principal defects in oxidative dehydrogenation reactions is that quite often the reactions are unselective and oxygenated compounds are formed instead of the desired dehydrogenated compounds. These nonselective reactions are particularly evident when the compound to be dehydrogenated contains three or more carbon atoms. For example, when methyl butene is reacted with oxygen, a variety of products other than isoprene may be produced such as hydrocarbons of shorter chain lengths and oxygenated hydrocarbons. Also, combustion of the hydrocarbon may result in the formation of CO, CO$_2$ and water. It is therefore one of the principal objectives of this invention to provide a process wherein the organic compound is dehydrogenated preferably to a product having the same number of carbon atoms at a high level of conversion and selectivity. Another principal objective is to provide a process wherein the catalyst has long catalyst life. Other objectives of this invention are to provide a process wherein substantial quantities of steam may be present in the dehydrogenation zone, and is also possible to have a high overall input and a low contact time in the dehydrogenation zone, a process wherein the catalyst is not easily disintegrated, a low maximum temperature during dehydrogenation and a process which has good control of reaction temperature.

SUMMARY OF THE INVENTION

Organic compounds are dehydrogenated by a process of oxidative dehydrogenation utilizing manganese ferrite in the dehydrogenation zone. The manganese ferrite has been prepared by reacting the ingredients in the presence of halogen. For example, manganese carbonate and iron oxide hydrate may be reacted in the presence of a source of halogen, such as Cl$_2$, HCl or Br$_2$ to form the manganese ferrite. The reaction to form the ferrite is preferably conducted in a relatively non-oxidizing atmosphere.

DESCRIPTION OF THE PREFERRED EMBODIMENT(S)

The process of this invention may be applied to the dehydrogenation of a great variety of organic compounds to obtain the corresponding unsaturated derivative thereof. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 2 to 6 or 8 carbon atoms.

Among the types of organic compounds which may be successfully dehydrogenated to the corresponding unsaturated derivative by means of the novel process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 or 3 chlorobutene-1 or 2, 3 dichlorobutane to chloroprene, ethyl pyridine to vinyl pyridine, ethylbenzene to styrene, isopropylbenzene to α-methyl styrene, ethylcyclohexane to styrene, cyclohexane to benzene, ethane to ethylene, propane to propylene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 2,3 dichlorobutane, 1,3 dichlorobutane, 1,4 dichlorobutane, the chlorofluoroethanes, methyl pentane, methylethyl ketone, diethyl ketone, n-butyl alcohol, methyl propionate, and the like. This invention is particularly adapted to the preparation of vinylidene compounds containing at least one CH$_2$=C< group, that is, a group containing a terminal methylene group attached by a double bond to a carbon atom, and having 2 to 12 carbon atoms by the dehydrogenation of compuonds of the formula CH$_3$—CH$_2$—R wherein R is an organic radical of from 0 to 10 carbon atoms, preferably a hydrocarbon. Similarly, acetylenic compounds of the formula CH≡C— may be produced from the same starting materials.

Preferably oxygen is employed, suitably in an amount within the range of 0.2 to about 5.0 mols of oxygen per mol of organic compound to be dehydrogenated, preferably from 0.2 to 2.5 mols per mol. Generally, better results may be obtained if the oxygen concentration is maintained between about 0.25 and about 1.6 mols of oxygen per mol of organic compound to be dehydrogenated, such as between 0.35 and 1.2 mols of oxygen. The oxygen may be fed to the reactor as pure oxygen, as air, as oxygen-enriched air, oxygen mixed with diluents, and so forth. Based on the total gaseous mixture entering the reactor, good results are obtained with oxygen present in an amount from about 0.5 to 25 volume percent of the total gaseous mixture, such as in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam. It is also within the scope of this invention to employ the described manganese compositions as the partial or sole source of oxygen used for oxidative dehydrogenation. For example, the manganese compositions may release oxygen to react with the organic compound during a dehydrogenation step and thereafter the manganese composition is regenerated by oxidation prior to another step where oxygen is released. Preferably such a process will have the manganese composition present as a moving bed.

It is one of the advantages of this invention that halogen may also be added to the reaction gases to give excellent results. The addition of halogen to the feed is particularly effective when the hydrocarbon to be dehydrogenated is saturated. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds, especially the ammonium compounds, being particularly preferred. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is from about 0.001 to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 650° C. or 750° C. or perhaps higher such as 900° C. under certain circumstances. However, excellent results are obtained within the range of or about 300° C. to 575° C., such as from or about 325° C. to or about 525° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The initial partial pressure of the organic compound to be dehydrogenated will preferably be equivalent to equal to or less than one-half atmosphere at a total pressure of one atmosphere. Generally, the combined partial pressure of the organic compound to be dehydrogenated, together with the oxygen in gaseous phase will also be equivalent to less than one-half atmosphere at a total pressure of one atmosphere. Preferably, the initial partial pressure of the organic compound to be dehydrogenated will be equivalent to no greater than one-third atmosphere or no greater than one-fifth atmosphere at a total pressure of one atmosphere. Reference to the initial partial pressure of the organic compound to be dehydrogenated means the partial pressure of the organic compound as it first contacts the catalytic particles. An equivalent partial pressure at a total pressure of one atmosphere means that one atmosphere total pressure is a reference point and does not imply that the total pressure of the reaction must be operated at atmospheric pressure. For example, in a mixture of one mol of ethyl chloride, three mols of steam, and one mol of oxygen under a total pressure of one atmosphere, the ethyl chloride would have an absolute pressure of one-fifth of the total pressure, or roughly six inches of mercury absolute pressure. Equivalent to this six inches of mercury absolute pressure at atmospheric pressure would be ethyl chloride mixed with oxygen under a vacuum such that the partial pressure of the ethyl chloride is 6 inches of mercury absolute. The combination of a diluent such as nitrogen, together with the use of a vacuum, may be utilized to achieve the desired partial pressure of the organic compound. For the purpose of this invention, also equivalent to the six inches of mercury ethyl chloride absolute pressure at atmospheric pressure would be the same mixture of one mol of ethyl chloride, three mols of steam, and one mol of oxygen under a total pressure greater than atmospheric, for example, a total pressure of 20 p.s.i.a. Thus, when the total pressure in the reaction zone is greater than one atmosphere, the absolute values for the pressure of the organic compound to be dehydrated will be increased in direct proportion to the increase in total pressure above one atmosphere.

Preferably, the reaction mixture contains a quantity of steam, with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the organic compound to be dehydrogenated per volume of dehydrogenation zone containing catalyst per hour (referred to as LHSV), wherein the volumes of organic compound are calculated at standard conditions of 0° C. and 760 mm. of mercury. Usually, the LHSV will be between 0.15 and about 5 or 10. For calculation, the volume of reactor containing catalyst is that volume of reactor space including the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times are, for example, from about 0.001 or higher to about 4 or 10 or 25 seconds, with particularly good results being obtained between 0.01 and 5 seconds. The contact time is the calculated dwell time of the reaction mixture in the reaction zone, assuming the mols of product mixture are equivalent to the mols of feed mixture. For the purpose of calculation of contact times, the reaction zone is the portion of the reactor containing catalyst which is at a temperature of at least 250° C.

Catalyst binding agents or fillers may be used, but these will not ordinarily exceed about 50 percent or 60 percent by weight of the catalytic surface, and the described catalytic compositions will preferably constitute the main active constituent. These binding agents and fillers will preferably be essentially inert. Preferred catalysts are those that have as a catalytic surface exposed to the reaction gases at least 25 or preferably 50 weight percent of the defined catalytic surface. Also preferably iron will constitute at least 50 atomic weight percent of the cations in the catalytic surface. Suitable catalysts are those which do not contain sodium or potassium as an additive in the crystal structure, such as those containing less than 5 or less than 2 percent by weight of sodium or potassium based on the total weight of the catalyst. This is particularly true for processes that do not utilize halogen in the dehydrogenation zone.

The dehydrogenation reactor may be of the fixed bed or fluid bed type. Conventional reactors for the production of unsaturated organic compounds by dehydrogenation are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like of catalytic material.

It has now been discovered that improved manganese ferrites may be formed by preparing manganese ferrite in a particular manner. It has also been discovered that these compositions of matter exhibit superior catalytic qualities such as for the oxidative dehydrogenation of organic compounds and for other uses. According to this invention the manganese ferrite is formed in the presence of halogen. The manganese and iron (both in the form of any suitable compounds to form manganese ferrite) are reacted in intimate combination with halogen.

The exact function of the halogen is not fully understood. Apparently, the halogen catalyzes the formation of manganese ferrite. However, the presence of the halogen also causes an improved manganese ferrite to be formed as evidenced by superior catalytic activity.

The halogen may be present in any suitable form wherein the halogen can be in intimate contact with the reactants during ferrite formation. The halogen may be present in the reaction atmosphere as molecular halogen or a volatile halogen compound such as $HX_2$ or $NH_4X$. However, a preferred method is to introduce the halogen by way of a solid inorganic compound which at least partially decomposes during ferrite formation. Metal or metalloid halides are satisfactory sources of the halogen. Manganese halide or iron halide (or hydrates thereof) are entirely satisfactory and desirable because manganese and iron are components of the manganese ferrite. Generally the halogen will be chlorine, bromine or iodine with chlorine being the preferred halogen. Suitable sources of halogen are such as $Cl_2$, $Br_2$, $I_2$, HCl, HBr, HI, $NH_4Cl$, alkyl halides containing 1 to 6 carbon atoms such as methyl chloride, halohydrins such as ethylene chlorohydrin, halo-substituted aliphatic acids such as chloroacetic acid, organic amine halide salts of the general formula $R_3N \cdot HX$ wherein R is a hydrocarbon radical containing from 1 to 8 carbon atoms such as methyl amine hydrochloride or hydrobromide and other halogen compounds such as $MnCl_4$, $MnCl_2 \cdot 4H_2O$, $MnCl_3$, $MnBr_3$, $MnI_2$, $MnI_2 \cdot 4H_2O$, $FeBr_2$, $FeBr_3$, $FeBr_3 \cdot 6H_2O$, $Fe(ClO_4)_2 \cdot 6H_2O$, $FeCl_2$, $FeCl_2 \cdot 2H_2O$, $FeCl_2 \cdot 4H_2O$, $FeCl_3 \cdot 6H_2O$, $FeF_2$, $CCl_4$ and the like. The preferred compounds are any of the manganese chlorides and hydrates thereof.

Generally, halide compounds will be used which require a temperature of no greater than 450° C. to exert a vapor pressure of at least 1 mm. of Hg at atmospheric pressure. Data showing the temperature necessary to achieve 1 mm. of Hg vapor pressure of various metal halides may be found on pages 540–550 of Industrial and Engineering Chemistry, vol. 39, No. 4 (April 1947) which article is incorporated herein by reference. However, halogen compounds other than those listed in that reference are useful according to this invention. Ordinarily, the halogen compound will have from 0 to 8 carbon atoms, and will have a molecular weight of less than 750. As mentioned, the function of the halogen is not fully understood. Furthermore, the actual mechanism during the reaction is also not fully understood. However, it is generally thought to be desirable to have the halogen present in an amount of from 0.0001 to 1.0 mol of halogen (calculated as mols of halogen, $X_2$) per atom of iron present in the manganese ferrite reactants. This halogen may be present either in the solid phase, volatile phase or combinations thereof. Generally speaking, the vapor atmosphere present during ferrite formation (which is considered as the temperature at which ferrite can first be detected and usually will be at a temperature of at least 250° C. or 350° C.) will contain from 0.0001 to 100 mol percent of halogen (calculated as mols percent of $X_2$), and preferably from 0.01 to 25 mol percent of the atmosphere. These ratios may be varied somewhat depending upon other factors such as the temperature of reaction, the remainder of the atmosphere, e.g., whether it is a relatively oxidizing or non oxidizing atmosphere, etc.

A preferred method for formation of the ferrite of this invention is to heat the reactant in an atmosphere containing less oxygen than normally contained in air, such as less than 15 or 20 mol percent oxygen. By thus causing the reaction to take place in an atmosphere deficient in oxygen, the manganese is less prone to be oxidized to a higher valence. The reaction to form the ferrite may be conducted essentially in the absence of air such as in an atmosphere of nitrogen or helium. Also, it is within the scope of the invention to conduct the reaction to form the ferrites in the presence of hydrogen, carbon monoxide or other reducing gas in order to maintain a reducing atmosphere for the manganese. The heating to form ferrite may also be partially or completely performed under conditions such as dehydrogenation in which case the ferrite formation is accomplished or completed in situ. Further, heating for ferrite formation is sometimes desirable in the presence of the compound to be dehydrogenated such as a hydrocarbon. Although not preferred, it is possible to prepare the manganese ferrite in the presence of halogen and a relatively oxidizing atmosphere such as air.

The temperature used for ferrite formation may be varied, depending somewhat upon the particular starting materials and upon the type of reaction atmosphere utilized, but it is a feature of this invention that relatively low temperatures are used. Speaking generally, higher temperatures may be employed to prepare the manganese ferrite compositions if a relatively non-oxidizing atmosphere is employed. For example, higher temperatures might be tolerated using nitrogen rather than air as the reaction atmosphere. When air, or any other relatively oxidizing atmosphere is present during ferrite formation, resort is usually made to other methods of preparation such as the heating of intimate mixtures of ferrite precursors formed by co-precipitation techniques. At any rate, superior compositions are produced at temperatures of from high enough to form the ferrite to 1000° C. or less. Still better compositions are ordinarily produced at temperatures of less than 850° C. and excellent manganese ferrites are produced at temperatures of less than 700° C. Suitable temperatures of reaction are such as between about 400 to 1000° C., with a preferred range being from between about 450 to 800° C.

Another factor in producing superior compositions is the rate of heating of the reactants to form the ferrite. Here again, the rate of heating will be dependent upon the particular reactants and atmosphere employed, but better results are generally obtained when the reactants are heated at a rate of no greater than about 250° C. per minute and still better results are ordinarily obtained when the rate is no greater than about 100° C. per minute.

The length of time for heating the reactants to form the ferrite will vary depending upon such as the particular reactants used, reaction atmosphere and heating rate. Suitably, the heating will be stopped reasonably shortly after a major portion of ferrite is formed. We have discovered that when precursors of manganese oxide or iron oxide are the reactants, e.g. when manganese carbonate is the starting compound, usually better results are obtained if the heating rate is controlled such that at least the major portion of the precursor has been decomposed to the oxide prior to substantial ferrite formation. This may be accomplished by slowly heating to decompose the precursor and thereafter increasing the temperature for ferrite formation.

Improved manganese ferrites result when there is intimate mixtures of the ingredients prior to or during ferrite formation. Along this same line it has been discovered that the reactants should preferably be finely divided such as passing through a 6 mesh U.S. Standard screen.

The manganese and iron starting materials will suitably be any compounds that will form manganese ferrite and generally will be precursors of manganese oxide and iron oxide under the conditions to form the ferrite. It is believed that compounds other than oxides are converted to oxides during the formation of the ferrite, but this may not necessarily be true. For example, manganese carbonate or oxalate are probably converted to manganese oxide prior to or during ferrite formation. Because manganese has more than one oxide it is possible for various oxides to be present at one or more stages in the process to produce the manganese ferrite. Starting materials may be such as oxides, hydroxides, or salts including oxalates, acetates, formates, sulfates, nitrates, halides, hydrates and so forth. Suitable manganese or iron compounds are such as manganese oxalate, manganese hydroxide, manganese nitrate, manganese carbonate, manganese salts of aliphatic monocarboxylic acids of 1 to 5 carbon atoms, manganese sulfates, salts of aliphatic alcohols of 1 to 5 carbon atoms, hydrates thereof, the corresponding iron compounds such as $Fe_2O_3$, and mixtures thereof. Suitably, the iron will have a valence predominantly of $+3$ after the ferrite is formed. The ratio of atoms of manganese to atoms of iron in the compositions will generally be within the range of from .20 to 1.0 atom of manganese per atom of iron with a preferred ratio being between .3 to .9.

The manganese ferrite compositions of this invention may also comprise additives. Phosphorus, silicon or mixtures thereof are examples of additives. For instance, phosphorus and/or silicon may suitably be present in an amount of from about 0.2 to 20 weight percent based on the total weight of the atoms of iron and manganese. These ingredients may contribute e.g. to the stability of the compositions. The silicon, phosphorus or other additives may be added at various stages of the preparation of the composition, or may be added to the already formed manganese ferrite. Any suitable compounds may be employed such as phosphoric acid, phosphorus pentoxide, ethyl phosphate, ammonium phosphate, silicon halides, etc.

The manganese ferrite composition may be reduced with a reducing gas, e.g. prior to use in the process of dehydrogenation. Examples of reducing gases are hydrogen or hydrocarbons. For example, the manganese ferrite compositions may be reduced with, e.g. hydrogen at a temperature of at least 250° C. with the temperature of reduction generally being no greater than 850° C. By reducing gas is meant a gas that will react with oxygen under the conditions of reduction. However, it is one of the advantages of this invention that the manganese ferrites prepared according to this invention may not require reduction prior to use in the dehydrogenation reaction.

According to this invention it has been found that the preferred manganese ferrite compositions exhibit a certain type of X-ray diffraction pattern. The preferred compositions do not have as sharp X-ray diffraction reflection peaks as would be found, e.g., in a high crystalline material having the same chemical composition. Instead, the preferred oxidants of this invention exhibit reflection peaks which are relatively broad. The degree of sharpness of the reflection peak may be measured by the reflection peak band width at half heighth (W h./2). In other words, the width of the reflection peak as measured at one-half of the distance to the top of the peak is the "band width at half heighth." The band width at half heighth is measured in units of ° 2 theta. Techniques for measuring the band widths are discussed, e.g., in Chapter 9 of Klug and Alexander, X-ray Diffraction Procedures, John Wiley and Son, N.Y., 1954. The observed band widths at half heighth of the preferred catalysts of this invention are at least 0.16 ° 2 theta and normally will be at least 0.20° 2 theta [1]. For instance, excellent oxidants have been made with band widths at half heighth of at least 0.22 or 0.23 ° 2 theta. The particular reflection peak used to measure the band width at one-half heighth is the

---

[1] The powder diffraction patterns may be made, e.g., with a Norelco constant potential diffraction unit type No. 12215/0, equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inch and scatter 1°. Strip chart recordings for identification are made with a scanning speed of ¼° per minute, time constant of 4 seconds and a full scale at $10^3$ counts per second. No correction is made for K $a$ doublet or instrumental broadening of the band widths.

reflection peak having Miller (hkl.) indices of 220. (See, e.g., Chapter of Klug and Alexander, ibid.) Applicants do not wish to be limited to any theory of the invention in regard to the relationship between activity and band width. The preferred oxidants will have as the most intense X-ray diffraction peak a peak within the rane of 2.50 to 2.58, and more preferably another peak of from 1.47 to 1.53. The preferred compositions will have surfaces generally comprising X-ray diffraction reflection peaks at $d$ spacings within or about 4.87 to 4.93, 2.97 to 3.03, 2.53 to 2.59, 2.09 to 2.15, 1.70 to 1.76, 1.61 to 1.67 and 1.47 to 1.53 (with other peaks) with the most intense peak being between 2.52 to 2.58 and with the main active constituent $MnFe_2O_4$. Superior results have been obtained with compositions having peaks between 4.88 to 4.92, 2.98 to 3.03, 2.54 to 2.58, 2.10 to 2.14, 1.71 to 1.75, 1.62 to 1.66 and 1.48 to 1.52, with the most intense peak being between 2.54 to 2.58. These ranges will generally be within the $d$-spacings of 4.88 to 4.92, 2.99 to 3.01, 2.54 to 2.57, 2.10 to 2.14, 1.71 to 1.75, 1.63 to 1.65 and 1.49 to 1.51, with the most intense peak being within the range of 2.54 to 2.57.

In the following examples the conversions, selectivities and yields are reported in mol percent. Otherwise, all percentages are weight percent unless expressed to the contrary.

EXAMPLE 1

The reactor used consists of two 23½ inch electric combustion furnaces mounted vertically one over the other about three inches apart. Each unit is capable of independent temperature control. Each of the two furnaces houses a 24 x 1 inch I.D., 316 stainless steel tube. These two tubes are joined by a common connection located between the two furnaces. The top tube contains 6 x 6 mm. Vycor[2] Raschig rings and is used to vaporize, mix and preheat reactants and/or diluents before they pass, downflow, over the catalyst bed contained in the bottom tube of the reactor system. The bottom tube contains 125 cc. of catalyst. Vycor Raschig rings (6 x 6 mm.) are used to support the catalyst at a desired level in the tube and also to fill any void space remaining in the tube above the level of the top of the catalyst bed. The temperature of the catalyst bed is measured with thermocouples inserted into a ¼ inch, 316 ss. thermowell located inside and coaxial with the reaction tube.

A manganese ferrite catalyst is prepared from 734 gms. of hydrated yellow ferric oxide, 533 gms. of manganous carbonate, and 20 gms. of $MnCl_2 \cdot 4H_2O$. These ingredients are thoroughly mixed in distilled water and the resulting slurry dried below 100° C. The dried cake is broken up, powdered and then heated to form the ferrite to about 575° C. in a Vycor reaction tube with nitrogen passing through the tube as a diluent (passage of 100 volumes of nitrogen/volume of catalyst/hour). The resulting reddish-brown powder is shown to be manganese ferrite by X-ray diffraction analysis.

[2] Vycor is the trademark of Corning Glass and is comprised approximately of 96 percent silica with the remainder being essentially $B_2O_3$.

This ferrite material is deposited as 35% actives on a 7–8 mesh fused Alundum support (Carborundum Company type AMC). Isoamylenes (86–88 mol percent 2-methyl-butene-2 + 7–8 mol percent 2 - methyl-butene-1), oxygen (as air) and steam are then fed in a molar ratio of 1.0, 0.7 and 30, respectively, over a 125 cc. bed of the catalyst. The isoamylenes are fed at a liquid hourly space velocity (LHSV) of 1.5 (LHSV is based on the volume of liquid hydrocarbon fed/volume of catalyst/hour). At a reaction temperature of 460° C., 55% of the isoamylenes are oxidatively dehydrogenated to a 51% yield of isoprene. The reaction is conducted at atmospheric pressure.

EXAMPLE 2

Example 1 is repeated, with the exception that the catalyst contains 2.5 atoms of iron per atom of manganese and the LHSV is decreased to 1.0.

EXAMPLE 3

A manganese ferrite catalyst is prepared according to the general procedure of Example 1 with an exception that the ferrite is formed at a temperature of 570° C. Butylenes (99% butene-2's), oxygen (as air) and steam are passed over a 125 cc. catalyst bed of 25% actives deposited on 3–5 mesh fused Alundum support (Carborundum Company type AMC). The butylenes are fed at an LHSV of 1.5. Oxygen and steam are fed at molar ratios of 0.50 and 15 per mol of hydrocarbon. Conversion of butylenes, at a reaction temperature of 475° C., is 56%; 1,3-butadiene is produced in a yield of 51 mol percent.

EXAMPLE 4

Example 3 is repeated, with the exception that the manganese ferrite is prepared by calcination to 1380° F. At a reaction temperature of 930° F., selectivity of converted butylenes to a product of butadiene is 91%.

EXAMPLES 5–12

Manganese ferrite is prepared as per Example 1. Using this catalyst and .05 mol of $Br_2$ (fed as $NH_4Br$) per mol of organic feed, the following runs are made:

| Ex. | Feed | Flow rate, LHSV | Max. temp., °C. | Gaseous diluent[1] | Oxygen[2] | Product |
|---|---|---|---|---|---|---|
| 5 | Propionitrile | 1.0 | 450 | 15 Steam | 0.75 | Acrylonitrile. |
| 6 | 2-chlorobutene-2 | 1.5 | 500 | do | 0.50 | Chloroprene. |
| 7 | Isobutyronitrile | 1.0 | 525 | 20 Steam | 0.75 | Methacrylonitrile. |
| 8 | Cyclohexene | 1.25 | 475 | 10 Nitrogen | 0.75 | Benzene. |
| 9 | Ethylcyclohexene | 0.75 | 525 | 10 Helium | 1.0 | Styrene. |
| 10 | 2,3-dichlorobutane | 1.25 | 500 | 15 Steam | 0.75 | Chloroprene, 2-chlorobutene-2. |
| 11 | Isopentane | 1.0 | 475 | 5 Steam | 2.0 | Isoprene. |
| 12 | Propionaldehyde | 1.25 | 425 | 15 Steam | 0.6 | Acrolein. |

[1] Per mol of the compound to be dehydrogenated.
[2] Mols of oxygen (as air) per mol of the compound to be dehydrogenated.

EXAMPLE 13

A manganese ferrite catalyst is prepared by slurrying together: 0.49 mol of manganese carbonate, 0.50 mol of yellow hydrated iron (III) oxide and 0.01 mol of manganese chloride, hydrate. These ingredients are slurried together in water and then dried at 120° C. The dried reactants are placed in a Vycor combustion tube and reacted at 630° C. in an atmosphere of nitrogen. The resulting manganese ferrite catalyst is deposited as 25% actives on 40–100 mesh fused Alundum support (Carborundum Company type AEHF).

The reactor consists of an electric, multiple-unit, tube type combustion furnace (as the heat supply) surrounding a stainless steel (type 316) reactor tube. The reactor tube has a stainless steel frit, located in the lower quarter of the tube, for support of the catalyst. This frit is well within the lower heated zone of the furnace, thus allowing the tube space below the frit to act as a preheat zone. The catalyst is charged to the reaction tube above the frit and a conical shaped disengaging section is attached to the upper end of the tube. Hydrocarbons, air and steam are fed to the reactor below the frit where they are mixed and preheated. The preheated gases flow through the frit where they contact and fluidize a 120 cc. charge of catalyst. After contact with the catalyst, the effluent gases exit from the reactor into a disengaging section where catalyst fines settle and are returned to the reactor tube. The gases then pass through a micro porous filter to remove any additional catalyst fines and, finally, are passed through a water cooled condenser where most of the steam is condensed. Samples of the effluent gases are collected for analysis after the steam has been removed.

Isoamylenes are fed to the reactor at an LHSV of 0.5. Oxygen (as air) and steam are fed to the reactor at a rate of 0.6 mol and 15 mols, respectively, per mol of hydrocarbon. Selectivity to isoamylenes, at 745° F., is about 89%.

EXAMPLE 14

Example 13 is repeated with butylene-2's being fed to the reactor at an LHSV of 0.5. Steam, 10 mols, and oxygen, 0.54 mol (as air), are fed to the reactor per mol of hydrocarbon. At a reaction temperature of 766° F., 54% of the butylenes are converted to reaction products; butadiene comprises 93% of the reaction products.

EXAMPLE 15

Example 13 is repeated using a hydrogen chloride vapor (same molar ratio of $Cl_2$) instead of manganese chloride during the initial preparation of the manganese ferrite.

EXAMPLE 16

Example 15 is repeated using the same mols of ferrous bromide as the halogen catalyst instead of manganese chloride.

EXAMPLE 17

Manganese ferrite is formed by reacting an intimate mixture of 221 grams of $Fe_2O_3$ (as a hydrate but calculated as $Fe_2O_3$) with 140 grams of $MnCO_3$ and 5.4 grams of $MnCl_2$. The mixture of reactants are co-deposited onto 450 grams of 7–9 mesh (U.S. Standard) AMC alumina support by the application of heat to a mixture of the support and an aqueous suspension of the reactants. Water is thus removed as a vapor leaving behind the mixture of reactants deposited onto the support.

A 125 cc. sample of the coated supports were loaded into a reactor having a catalyst section of 24 inches of one-inch I.D. 316 stainless steel. The reaction to form the ferrite is conducted in an anhydrous HBr atmosphere by passing HBr through the reactor at a rate of 50 volumes of HBr per volume of coated supports (.125 cc.) per hour. The reactor was heated to a temperature of about 575° C. over a period of one hour and thereafter cooled to 400° C. prior to dehydrogenation. The resulting composition is used to dehydrogenate a hydrocarbon mixture of 89 mol percent 2 methyl butene-2 and 8 mol percent 2 methyl butene-1 to isoprene. The flow rates are 0.9 and 30 moles respectively of oxygen (as air) and steam per mol of hydrocarbon fed. The flow rate is 1.5 liquid hourly spaced velocity. At a maximum reactor temperature at 940° C., the selectivity to isoprene is greater than 80 percent.

We claim:
1. A process for the oxidative dehydrogenation of organic compounds in vapor phase which comprises contacting the said organic compound in the presence of a composition comprising manganese ferrite wherein the manganese ferrite is formed in the presence of chlorine.

2. The method of claim 1 wherein the manganese ferrite is formed at a temperature of less than 1000° C.

3. The method of claim 1 wherein the manganese ferrite is formed at a tempreature of less than 850° C.

4. The method of claim 1 wherein manganese ferrite is formed by reacting manganese carbonate and a member selected from the group consisting of $Fe_2O_3$, hydrates of $Fe_2O_3$ and mixtures thereof.

5. The method of claim 1 wherein the manganese is present as a member selected from the group consisting of MnO and a compound convertible to MnO under the conditions of reaction to form the manganese ferrite.

6. The method of claim 1 wherein the manganese is initially present as a compound selected from the group consisting of manganese oxalate, manganese hydroxide, manganese nitrate, manganese carbonate, manganese salts of aliphatic monocarboxylic acids of 1 to 5 carbon atoms, manganese sulfates, salts of aliphatic alcohols of 1 to 5 carbon atoms, hydrates thereof and mixtures thereof.

7. The method of claim 1 wherein the manganese ferrite is formed by heating precipitates of manganese and iron compounds.

8. The method of claim 1 wherein the chlorine is supplied by manganese chloride or hydrates thereof.

9. The method of claim 1 wherein the manganese ferrite is formed from a precursor of manganese oxide and the manganese ferrite reactants are heated at a rate and temperature whereby the manganese oxide precursor is predominantly converted to manganese oxide prior to the reaction to form manganese ferrite.

10. The method of claim 1 wherein the manganese ferrite is prepared by heating an intimate mixture of manganese carbonate, a member selected from the group consisting of alpha ferric oxide and hydrated alpha ferric oxide, and a member selected from the group consisting of manganese chloride and manganese chloride hydrate wherein the said mixture is first heated to predominantly convert the manganese carbonate to manganese oxide and thereafter the reactants are heated at a temperature of less than 700° C. to form the manganese ferrite.

11. The method of claim 1 wherein the said organic compound is a hydrocarbon of 3 to 9 carbon atoms.

12. The method of claim 1 wherein the said organic compound is an acyclic aliphatic hydrocarbon of 4 to 5 carbon atoms.

13. The method of claim 1 wherein the said organic compound is selected from the group consisting of normal butene, methyl butene and mixtures thereof.

14. The method of claim 1 wherein the said organic compound is methyl butene and the product is isoprene.

15. The method of forming manganese ferrite which comprises reacting as the precursor of manganese a compound selected from the group consisting of manganese oxalate, manganese hydroxide, manganese nitrate, manganese carbonate, manganese salts of aliphatic monocarboxylic acids of 1 to 5 carbon atoms, manganese sulfates, manganese salts of aliphatic alcohols of 1 to 5 carbon atoms, hydrates thereof and mixtures thereof with a member selected from the groups consisting of $Fe_2O_3$ and hydrated $Fe_2O_3$ in the presence of a catalytic amount of chlorine as a catalyst for the formation of the said manganese ferrite.

16. The method of claim 15 wherein the said precursors are finely divided and intimately mixed solids during ferrite formation.

17. The method of claim 15 wherein the manganese ferrite is formed at a temperature of less than 1000° C.

18. The method of claim 15 wherein the manganese ferrite is formed at a temperature of less than 850° C.

19. The method of claim 15 wherein manganese ferrite is formed by reacting manganese carbonate and a member selected from the group consisting of $Fe_2O_3$, hydrates of $Fe_2O_3$ and mixtures thereof.

20. The method of claim 15 wherein the manganese ferrite is formed by heating precipitates of manganese and iron compounds.

21. The method of claim 15 wherein the chlorine is supplied by manganese chloride or hydrates thereof.

22. The method of claim 15 wherein the manganese ferrite is formed from a precursor of manganese oxide and the manganese ferrite reactants are heated at a rate and temperature whereby the manganese oxide precursor is predominantly converted to manganese oxide prior to the reaction to form manganese ferrite.

23. The method of claim 15 wherein the manganese ferrite is prepared by heating an intimate mixture of manganese carbonate, a member selected from the group consisting of alpha ferric oxide and hydrated alpha ferric oxide, and a member selected from the group consisting of manganese chloride and manganese chloride hydrate wherein the said mixture is first heated to predominantly convert the manganese carbonate to manganese oxide and thereafter the reactants are heated at a temperature of less than 700° C. to form the manganese ferrite.

References Cited
UNITED STATES PATENTS

| | | | |
|---|---|---|---|
| 3,027,327 | 3/1962 | Blank | 23—51UX |
| 3,050,572 | 8/1962 | Masterton et al. | 260—680(E) |
| 3,338,952 | 8/1967 | Callahan et al. | 260—680(E) |
| 3,365,269 | 1/1968 | Chamberland | 23—51X |
| 3,378,335 | 4/1968 | Ellis et al. | 23—51 |
| 3,420,912 | 1/1969 | Woskow et al. | 260—680(E) |

PAUL M. COUGHLAN, Jr., Primary Examiner

U.S. Cl. X.R.

23—51; 252—471; 260—696